March 23, 1971   R. A. MEYER   3,572,096
METHOD AND APPARATUS FOR INSPECTING SEALED
PACKAGES FOR LEAKS
Filed Dec. 23, 1968

INVENTOR.
RAYMOND A. MEYER
BY

United States Patent Office 3,572,096
Patented Mar. 23, 1971

3,572,096
METHOD AND APPARATUS FOR INSPECTING SEALED PACKAGES FOR LEAKS
Raymond A. Meyer, Thousand Oaks, Calif., assignor to North American Rockwell Corporation
Filed Dec. 23, 1968, Ser. No. 785,879
Int. Cl. G01m 3/16
U.S. Cl. 73—40.7       8 Claims

ABSTRACT OF THE DISCLOSURE

A method of and apparatus for inspecting sealed packages for leaks where a sealed package in an improved inspection fixture is exposed to a relatively low-pressure carrier gas for a short time period that results in a readout developed by a detector readout instrument which distinguishes gross, medium, and fine package leaks.

BACKGROUND OF THE INVENTION

There are many types of sealed packages from packaged cereals to packaged electronic components. Sealed packages contain either a commodity or a unit of a product and protect the package contents (1) by excluding or sealing out the ambient environment about the package, and (2) by including or sealing in a desired ambient about the contents sealed within the package. The useable shelf-life of the commodity or unit is, therefore, primarily dependent upon the integrity of the sealed package.

There is a continuing need for dependable yet rapid systems for inspecting the integrity of sealed packages. Where the production rate of a packaged commodity or a packaged unit is in the hundreds of thousands, a high degree of accuracy and low average time for the inspection of each sealed package are important to the profitable success of the producer.

For example, integrated electronic circuits have moved from the laboratory with a production rate of 10 or 20 handcrafted units each year to the production line with an annual production in the several millions. Many of these integrated circuits are placed, either individually or by small groups, within a sealed package that can have a minimum internal volume of about two-to-five microliters. The useable shelf life of the packaged integrated circuits depends upon the integrity of the sealed packages.

The integrity of a sealed package is spoiled by leaks. A large leak in the sealed package is like removing the lid from a jar; the package integrity has failed and the package must be rejected. Similarly, a medium leak such as a relatively small hole is reason to reject the package, and even a fine leak can mean rejection of the faulty package. Where the time required for the package environment to exchange with the outside environment is long, for example, about three years through a fine leak, the integrity of the sealed package may be adequate when the integrated circuit is used within a short time of packaging. Therefore, accurate and rapid inspection systems are required that can determine not only large leaks but also fine leaks in sealed packages. Prior to my invention no such single inspection system was available that was satisfactory for accurately determining all leaks, whether large or fine, in a sealed package.

Sealed packages are currently inspected for leaks by several methods in known prior art systems. One is a bubble test where four or five packages are first dunked into a hot Freon or glycerine bath and then observed to see whether or not a bubble develops from any one or all of the packages. If a bubble occurs the suspect package is rejected. However, there is always the possibility that a small bubble of air can cling to the package surface when the package is dunked (air is predominantly nitrogen so for the purposes of the present description air and nitrogen are considered to be synonymous). The unwanted air bubble rides along, expands, and drifts away from the package so that it cannot be determined visually whether the drifting bubble originated from a leak in the package or as an external bubble; the result is that the suspect package is rejected. A Freon bath will reduce this problem of the unwanted bubble but does not eliminate the problem.

After the thermal shock of dunking the package in the hot bath, each package is placed in a chamber and pressurized under a controlled atmosphere such as helium for a controlled period of time—typically about 65 pounds per square inch gage (p.s.i.g.) for 60 minutes. The increased chamber pressure results in physical deformation of the package wall, although generally this deformation is not permanent. After the controlled period of time, the chamber is depressurized and the package placed in a detector instrument chamber (when helium is the pressurizing atmosphere, the instrument would be a helium detector). A vacuum is drawn on the detector instrument chamber so that all the air is removed from the chamber. An attempt is then made to sense any helium that may be escaping through a leak in the sealed package. Assuming that the sealed package did have a leak, hopefully some helium will remain within the package to escape through the leak.

There are other tests which follow similar inspection steps—all subjecting a sealed package to a pressurized atmosphere for prolonged time periods and then sensing whether or not any of the atmosphere which may have entered the package through a leak is exuding from the package. Understandably, accuracy is low, the average time for each package inspection is high, and the possibility of package deformation is present.

OBJECTS OF THE INVENTION

Accordingly, it is an object of the invention to provide a new and improved method of an apparatus for inspecting or testing sealed packages for leaks.

It is an object of the invention to provide a method and apparatus for inspecting sealed packages for leaks having a wide range of magnitude.

It is an object of the invention to provide a method of and apparatus for inspecting sealed packages for leaks that eliminates severe mechanical strains to the packages.

It is an object of the invention to provide a method of and apparatus for inspecting sealed packages for leaks that is economical, dependable, highly accurate, and rapid.

SUMMARY OF THE INVENTION

Briefly, in accordance with the invention, a sealed package to be inspected for leaks is positioned within a small chamber in an inspection fixture and the air within the chamber replaced with a gas such as helium in the shortest possible time. The chamber is then placed in a flowing stream of helium that leads to a detector instrument which is sensitive to nitrogen, for example, but not to the helium carrier gas. A gross leak in the sealed package results in a large, short-lived detector signal; while a fine leak results in a step-wise displacement.

The chamber is sequentially purged with helium and placed on-line with the detector instrument, and a continuous screen of helium provided during the inspection by the inspection fixture and related control valves. The inspection fixture has an inner primary chamber formed by separable mating parts that enclose the package, and an outer secondary chamber for the continuous screen gas around the mating edges of the primary chamber.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
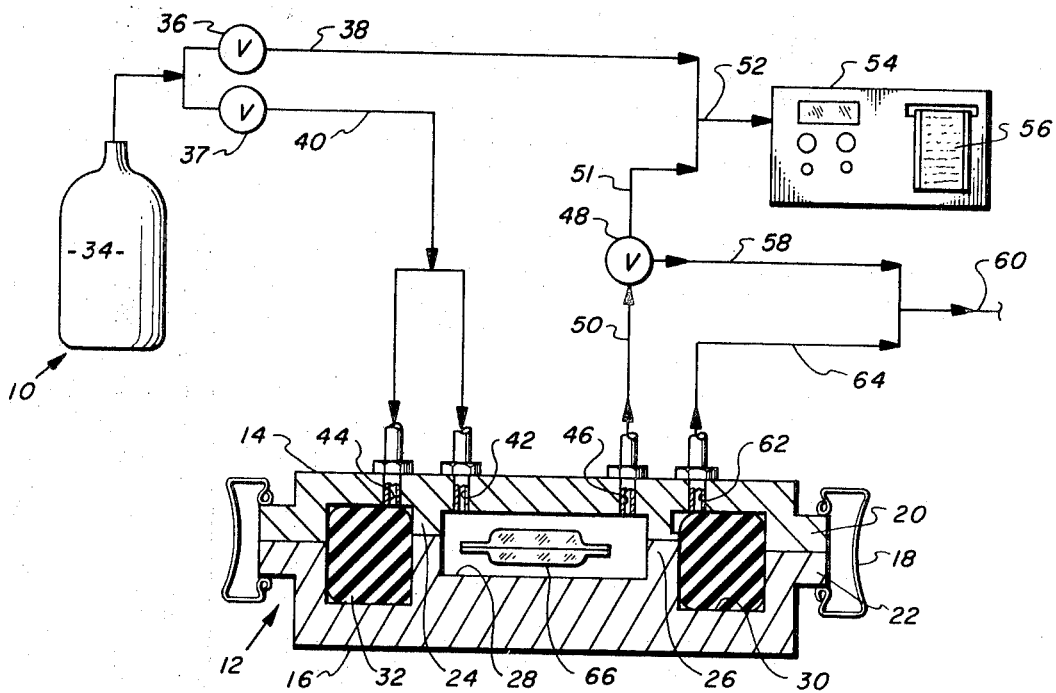
FIG. 1 is a schematic diagram of the apparatus for inspecting sealed packages employing one form of inspection fixture, shown in section, according to the inventions.

Referring to FIG. 1, one form of apparatus system 10 for the inspection or testing of sealed packages for leaks in accordance with my invention includes an inspection fixture 12. It is contemplated that the inspection fixture may be employed in other forms of inspection systems where it is desirable to accurately and rapidly inspect sealed packages.

The inspection fixture 12 of FIG. 1 in the form as shown has separable mating parts 14 and 16 that are releasably clamped together by similar spring clamp members 18 acting upon respective flange edges 20 and 22 of fixture parts 14 and 16. When fixture parts 14 and 16 are clamped together as shown, inner land 24 of fixture part 14 contacts inner land 26 of fixture part 16 in a sealing engagement which develops a substantially fluid-tight barrier between an inner primary chamber 28 and an outer secondary chamber 30. A resilient gasket member 32, which can be an O-ring or the like, is positioned within the outer secondary chamber 30 and provides a secondary fluid-tight barrier that cooperates with the fluid-tight barrier between the primary and secondary chambers 28 and 30.

In the apparatus system 10 of FIG. 1, a gas source 34 is connected through suitable control valve means such as source control valves 36 and 37 in respective lines 38 and 40. The gas source 34 is connected through line 40 to an inlet 42 and thereby to the primary chamber 28, and to an inlet 44 to the secondary chamber 30. An outlet 46 from the primary chamber 28 is selectively connected through a suitable control valve means such as test control valve 48 in line 50 either (1) to line 51, which is connected through line 52 to a detector instrument 54 having a suitable signal responsive device such as a curve readout or strip chart recorder 56 as schematically shown, or (2) to line 58 which is connected to a vent or discharge line 60. Line 38 is also connected through line 52 to the detector instrument 54. An outlet 62 from the secondary chamber is connected directly to discharge line 60 through line 64.

Operatively, a sealed package 66 that is to be inspected for leaks is placed within the inner primary chamber 28. The fixture parts 14 and 16 are clamped together enclosing the sealed package 66 and control valves 36 and 37 are opened. Gas from the gas source 34 flows through line 38 to the detector instrument 54 and through line 40 into the primary and secondary chamber 28 and 30 through respective inlets 42 and 44. The gas flow sweeps or purges the primary and secondary chambers 28 and 30 of air which is forced from the chambers through the respective outlets 46 and 62. Control valve 48 is initially positioned to direct the purged air that passes from the primary chamber 28 through line 58 to line 60. The purged air that passes from the secondary chamber 30 through line 64 is also directed to line 60. Control valve 36 is open during this period to provide continuous gas flow through the detector instrument 54. After a preselected period of time, substantially all of the air has been purged from the primary and secondary chambers 28 and 30 and only the source gas flows through line 60. Control valve 48 is then positioned to direct the source gas that passes through line 50 from the primary chamber 28 to line 51 and thereby to line 52 which is connected to the detector instrument 54, and control valve 36 is closed. The source gas thus has a dual function; first as a carrier gas through the primary chamber 28, and secondly as a continuing screen gas through the secondary chamber 30. The screen gas flow through the secondary chamber dilutes and flushes any air from the secondary chamber of the inspection fixture which possibly remains in a corner or crevice of the chamber so that the probability of any air entering the primary chamber 28 while the sealed package 66 is being inspected is substantially if not totally eliminated.

Figure 2:
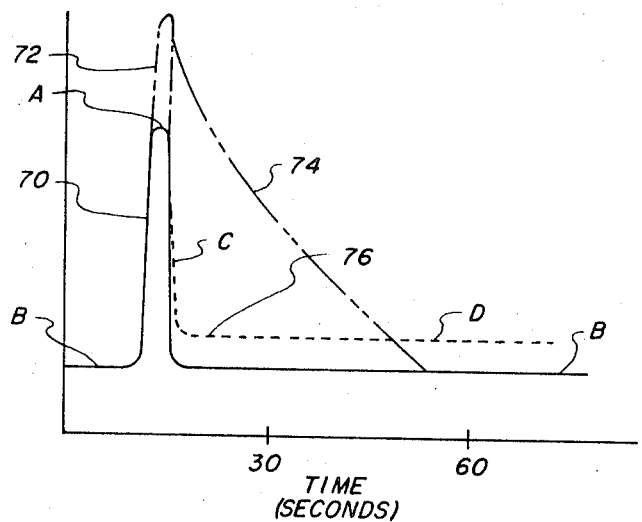
FIG. 2 is a graphical representation of recording curves developed by the inspection apparatus and method of the invention when inspecting sealed packages for the presence or absence of leaks.

Referring to FIG. 2, after the initial purge of the primary chamber 28 of air, when the source gas is helium and the detector instrument is a conventional gas chromatographic detector that is sensitive to nitrogen but not helium, the detector instrument 54 senses the gas flow from the primary chamber and a resulting information signal is converted to a curve readout by the recorder 56 which develops curve 70; the control valve 48 is positioned to direct the primary chamber atmosphere after the initial purging through line 51 and thereby to line 52. Curve 70 exhibits a peak portion A which is related to the amount of background air that is swept from the primary chamber 28 by the source helium. Portion B of curve 70 represents the instrument reference line when only source helium is sensed by the detector instrument. Note that peak portion A of calibration curve 70 is a large, short-lived deflection when compared to the relatively flat portion B.

When the sealed package 66 is positioned in the primary chamber 28 the chamber is purged of air to the vent or discharge line 60 and then the primary chamber is placed on-line with the detector instrument 54 in accordance with the foregoing. If the package has a gross leak, the detector instrument senses the air rapidly escaping from the package and develops a corresponding gross-leak curve 72 as shown by FIG. 2. Where the package has a gross leak, the deflection from the reference line (portion B of curve 70) is large and short-lived. If the package has a medium leak, the resulting curve 74 exhibits a large initial deflection along curve trace 72 and then a relatively rapid return to the reference line. If the package has a fine leak, the resulting curve 76 has a short-lived deflection portion C that flattens out and develops a prolonged portion D that is, in effect, a newly established "reference line." Thus, curve 76 is a step-wise displacement.

Example

The apparatus system as described has been successfully tested. A group of small, hermetically sealed electronic packages were inspected where the individual package measured ¼ x ⅛ x ⅙ inch and contained 3 to 5 microliters of nitrogen gas at an internal pressure slightly less than atmospheric. A helium carrier gas carried any exuding nitrogen from leaks in the sealed packages to a high-sensitivity, gas chromatographic detector (Varian Aerograph helium detector). Leaks ranging from $1 \times 10^{-4}$ to $1 \times 10^{-8}$ cubic centimeters of nitrogen at standard temperature and pressure per second were measured. Severe mechanical and thermal strains to the sealed packages were eliminated since the exposure to the helium carrier gas at 5 pounds per square inch gauge or less [1] was relatively brief (less than one minute per package).

As will be evidenced from the foregoing description, certain aspects of the invention are not limited to the particular details of construction as illustrated, and it is

---

[1] The external pressure of 5 p.s.i..g. can be reduced to 0 p.s.i.g. where desired. In the example, 5 p.s.i.g. was used for system convenience.

contemplated that other modifications and applications will occur to those skilled in the art. It is, therefore, intended that the appended claims shall cover such modifications and applications that do not depart from the true spirit and scope of the invention.

I claim:
1. An inspection system for leaks in sealed gas-filled packages, the system comprising:
    (a) inspection fixture means adapted to receive a sealed package,
    (b) at least an inlet means and an outlet means to said inspection fixture means,
    (c) gas source means providing a supply of a preselected gas different from the gas contained in the package,
    (d) detector means adapted to detect the presence of gas exuding from a leak in a sealed package and having at least a first detector inlet means, and
    (e) control means connecting said gas source means to said inspection fixture inlet means and connecting said inspection outlet means to said detector inlet means so that said detector means detects only gas exuding from a leak in the sealed package positioned within said inspection fixture means.
2. The inspection system of claim 1 in which said control means includes a vent means that selectively discharges gas from the inspection fixture means.
3. The inspection system of claim 2 in which said inspection fixture means comprises:
    (a) at least first and second separable members,
    (b) connecting means cooperating with and removably connecting said first and second separable members,
    (c) at least a primary chamber and a second chamber defined by said connected first and second separable members, said secondary chamber generally enclosing said primary chamber,
    (d) a substantially fluid-tight primary seal means between said primary and said secondary chambers, and
    (e) a secondary seal means developing a substantially fluid-tight secondary seal means,
    (f) said inlet means including an inlet to said primary chamber and an inlet to said secondary chamber, and said outlet means including an outlet from said primary chamber selectively and sequentially connected to said vent means and to said detector means and an outlet from said secondary chamber connected to said vent means.
4. The inspection system of claim 3 in which said secondary seal means is resilient and is positioned within said secondary chamber.
5. An inspection system for leaks in sealed gas-filled packages, the system comprising:
    (a) inspection fixture means defining a primary chamber and a secondary chamber, said primary chamber generally enclosed by and physically separated from said secondary chamber and adapted to receive a sealed gas-filled package,
    (b) gas source means providing a supply of a preselected gas different from the gas contained in the package,
    (c) detector means adapted to detect the presence of gas exuding from a leak in a sealed package and having at least a first detector inlet means, and
    (d) vent means selectively discharging gas from said primary chamber and continuously discharging gas from said secondary chamber, and
    (e) control valve means selectively connecting said gas source means to said primary and secondary chambers and selectively and sequentially connecting said primary chamber to said vent means and to said detector means.
6. The method of inspecting a sealed gas-filled package for a leak comprising:
    (a) placing the package in an inspection chamber,
    (b) sealing the inspection chamber,
    (c) passing a preselected gas different from the gas contained in said package through the inspection chamber and through an inlet therein, and purging said chamber with said preselected gas,
    (d) analyzing the gas exiting from an outlet of the inspection chamber after a predetermined period of time to determine whether gas exuding through a leak in the sealed package is present in said preselected gas and
    (e) removing said package from the inspection chamber.
7. The method of inspecting a sealed gas-filled package for a leak comprising:
    (a) placing the package in an inspection chamber,
    (b) sealing the inspection chamber,
    (c) passing a preselected gas different from the gas contained in said package through the inspection chamber and through an inlet therein, said preselected gas being helium,
    (d) analyzing the gas exiting from an outlet of the inspection chamber after a predetermined period of time by means of a gas chromatographic helium detector to determine whether gas exuding through a leak in the sealed package is present in said preselected gas and
    (e) removing said package from the inspection chamber.
8. The method of inspecting a sealed gas-filled package for a leak comprising:
    (a) placing the package in an inspection chamber physically defined within a second chamber,
    (b) sealing the inspection chamber,
    (c) passing a preselected gas different from the gas contained in said package through the inspection chamber and through the secondary chamber, purging said inspection and secondary chambers with said preselected gas,
    (d) analyzing the gas exiting from an outlet of the inspection chamber after a predetermined period of time to determine whether gas exuding through a leak in the sealed package is present in said preselected gas while venting the preselected gas passing through said secondary chamber, and
    (e) removing said package from the inspection chamber.

References Cited
UNITED STATES PATENTS

| | | | |
|---|---|---|---|
| 3,027,753 | 4/1962 | Harder, Jr. | 73—49.3X |
| 3,251,217 | 5/1966 | Evens et al. | 73—23.1 |
| 3,352,146 | 11/1967 | Lyssy | 73—38 |
| 3,364,729 | 1/1968 | Yearwood | 73—49.3X |
| 3,431,772 | 3/1969 | Sunner et al. | 73—38 |

LOUIS R. PRINCE, Primary Examiner

W. A. HENRY II, Assistant Examiner